United States Patent

[11] 3,616,317

| [72] | Inventors | Harold David McLellan;<br>Walter Keith Armour, both of Kitimat,<br>British Columbia, Canada |
|---|---|---|
| [21] | Appl. No. | 861,861 |
| [22] | Filed | Sept. 29, 1969 |
| [45] | Patented | Oct. 26, 1971 |
| [73] | Assignee | Alcan Research and Development Limited<br>Montreal, Canada |

[54] ALUMINUM POT LINE AND METHOD OF OPERATING SAME
17 Claims, 3 Drawing Figs.

[52] U.S. Cl....................................................... 204/67,
204/243 M, 204/244
[51] Int. Cl......................................................... C22d 3/12,
C22d 3/02
[50] Field of Search............................................
204/243–247, 67

[56] References Cited
UNITED STATES PATENTS
3,385,778    5/1968   Johnson ........................ 204/244 X
3,415,724   12/1968   Heaton et al. ................. 204/244 X

*Primary Examiner*—John H. Mack
*Assistant Examiner*—D. R. Valentine
*Attorneys*—Robert S. Dunham, P. E. Henninger, Lester W. Clark, Gerald W. Griffin, Thomas F. Moran, Howard J. Churchill, R. Bradlee Boal, Christopher C. Dunham and Robert Scobey ABSTRACT: In an aluminum pot line including plural electrolytic pots for production of aluminum metal arranged in end-to-end relationship in at least two rows and provided with electricity by plural parallel conductor bus bars arranged longitudinally of the pots, an independent bus bar at the rear of each row of pots for degaussing the magnetic field created by the electricity carried by the conductor bus bars of the opposite row of pots. The degaussing bus bar is located in substantially the same horizontal plane as the conductor bus bars and carries up to about 25 percent of the current of the latter, but in an opposing direction. The electric current of the degaussing bus bar may be subsequently cycled into the conductor bus bars.

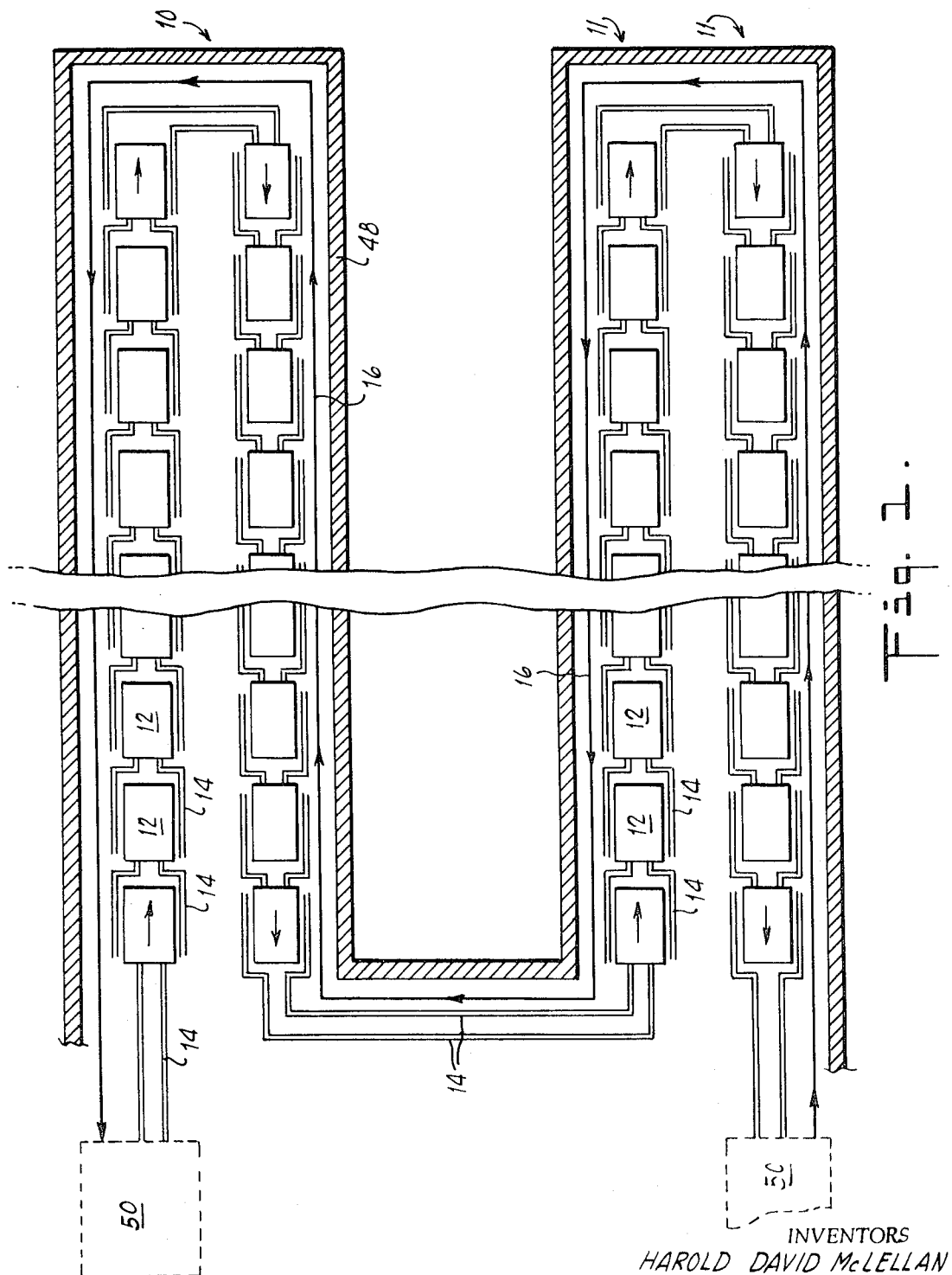

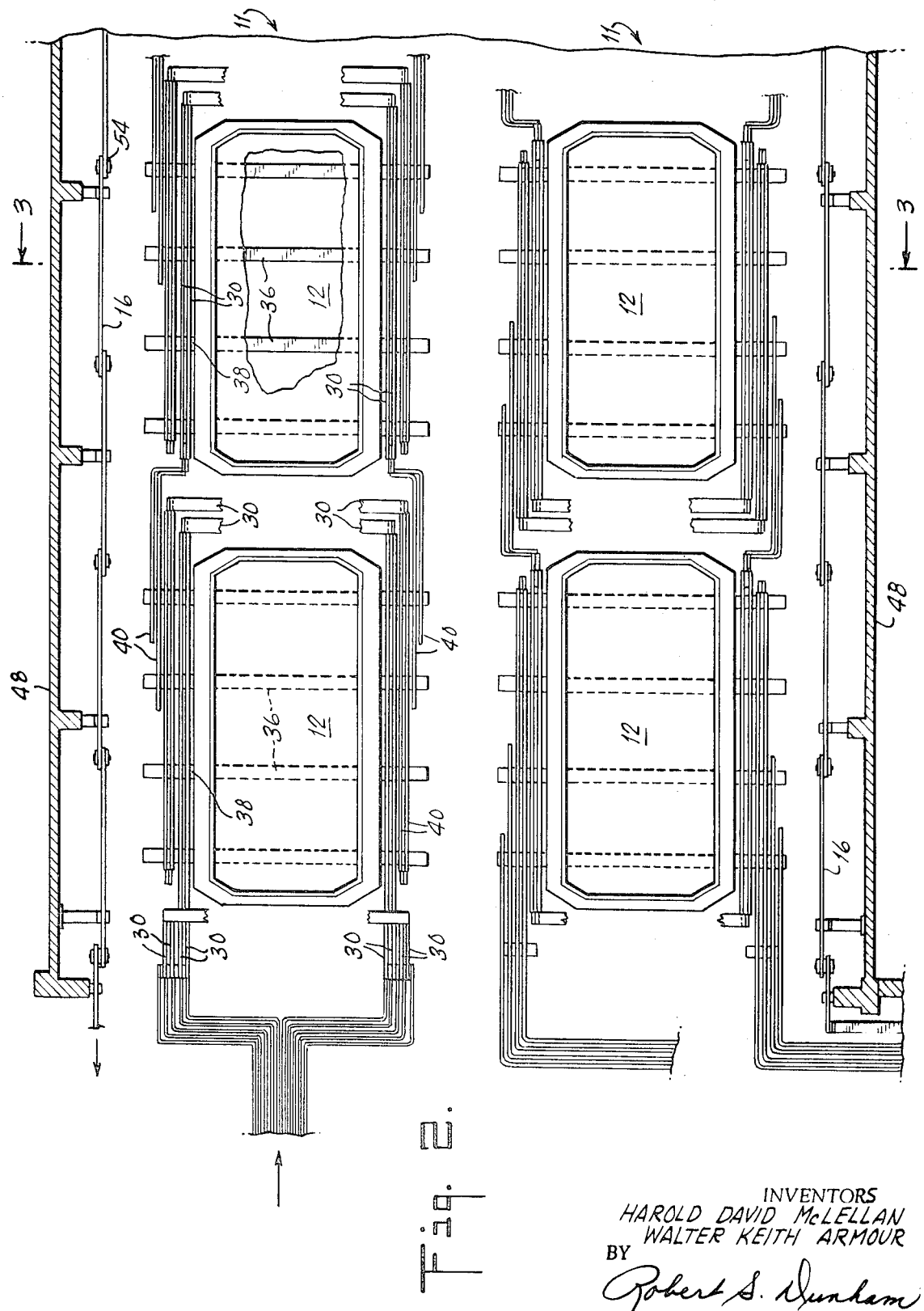

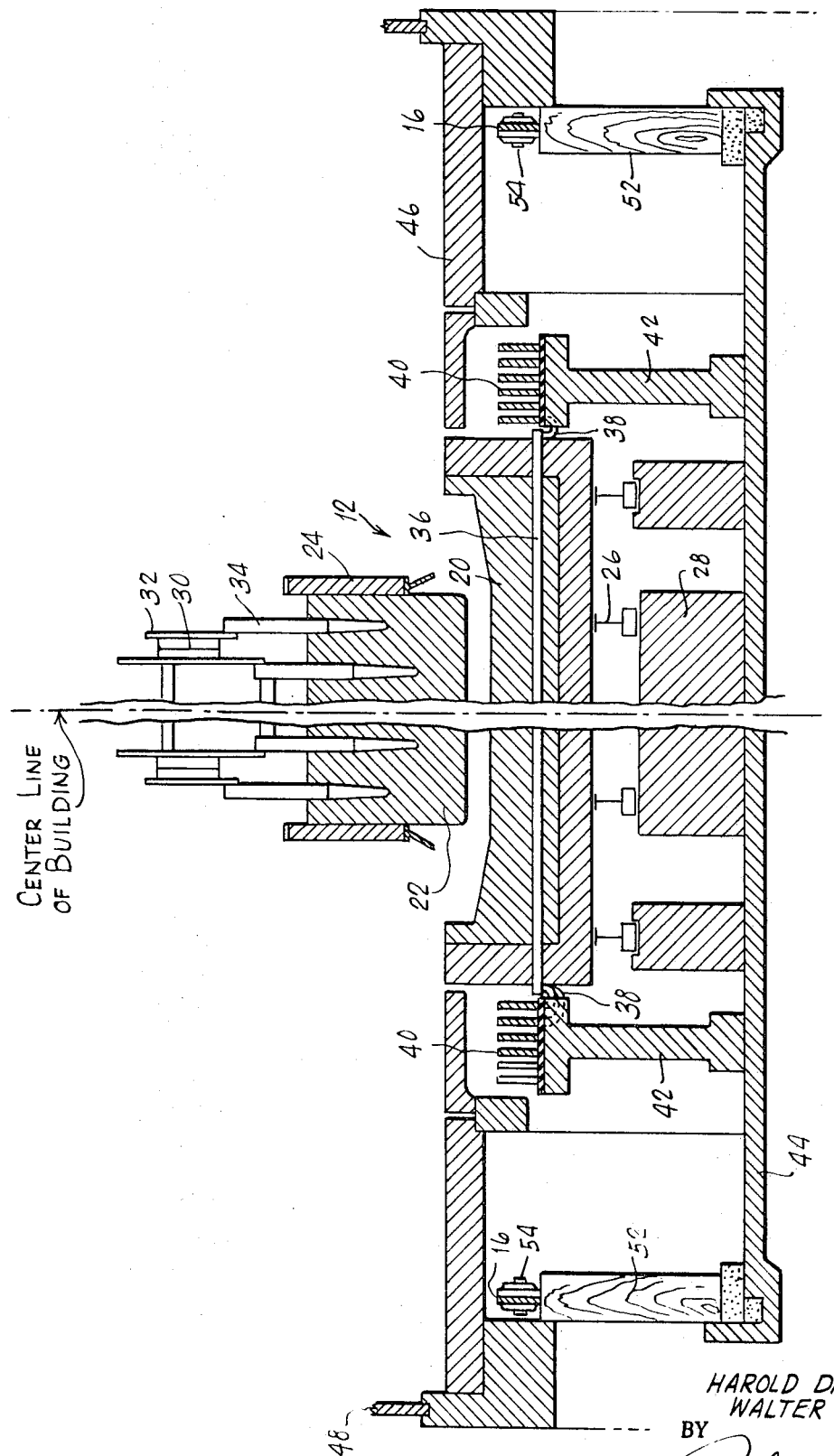

3,616,317

ALUMINUM POT LINE AND METHOD OF OPERATING SAME

BACKGROUND OF THE INVENTION

This invention relates to the electrolytic production of aluminum and to means for controlling the magnetic fields generated during aluminum production. More particularly, the present invention concerns a method and apparatus for degaussing or altering the magnetic field generated by the high electric current carried by the conductor bus bars disposed in proximity to the electrolytic pots when the pots are positioned in series end-to-end relationship.

In the production of aluminum, it is customary to arrange the electrolytic pots in parallel rows. The pots in each row are connected in series, i.e. the cathode of one pot is connected to the anode of the next pot in line, so that electric current flows through one entire row of pots and returns through an adjacent row of pots. It is further necessary to connect the pots in series as the low voltage drop across each pot, i.e. on the order of 4 –6 volts, would be insufficient to employ an electrical generator providing a standard voltage. On the other hand, the amount of current passing through each pot is extremely high, and in new installations may greatly exceed 100,000 amperes.

Due to the high current flow along the conductor bars and between the electrolytic pots, a magnetic field is created about each row of pots which affects the magnetic field about the pots of adjacent rows. This magnetic effect causes the molten aluminum contained within the pots of adjacent rows to be displaced toward the sides of the pots away from the row creating the interfering field, the upper surface of the molten aluminum being tilted or humped to a significant extend, i.e. up to as much as 2 inches. Furthermore, the upper surface of the aluminum metal may fluctuate considerably during the electrolysis leading to erratic and hence inefficient pot operation.

In general, the industry has attempted to overcome this obstacle to the installation of even larger electrolytic pot lines by modifying the manner of connecting the pots. In one arrangement, the magnetic effects and hence the tilting or humping of the molten aluminum in the pots are somewhat alleviated by feeding current into the both ends of the anode conductor bus bars and removing it through the both ends of the cathode conductor bus bars. But that arrangement is useful only when the pots are arranged in side-by-side relationship rather than in the end-to-end arrangement.

In another arrangement, the conductors are divided into plural parallel bars forming nearly a horizontal sheet of conductors beneath the pots, the conductors alternately supplying the anodes and the cathodes. Although this configuration tends to suppress the magnetic fields, the large number of conductors necessitated interferes with operation of the potlines as well as occupying a good deal of space.

It has also been proposed to located the conductors at as great a distance from the pots as possible, while directing the current in adjacent conductors in opposing directions. Again, such an arrangement requires extensive housing and consequent large investment. Moreover, the extra length of bus bars needed to connect the conductors to the pots results in excessive power loss.

Still another construction involves locating the conductors closely adjacent to each other and to the electrolytic pots with the currents in the conductors flowing in opposing directions so that the electromagnetic action from one line of conductors counterbalances that from the other. Such a system interferes with the operation of the potline and does not overcome the magnetic effects caused by the connections of the conductors themselves to the pots. It also requires duplication of the entire lengths of the conductor bus bars.

It is thus desirable to provide an electrolytic process for the manufacture of aluminum utilizing high current wherein the magnetic effects created by the current do not cause the molten metal in the pots to become excessively unsettled.

It is further desirable to provide a means for degaussing or altering the magnetic field without interfering with operation of the potline and without necessitating a large investment in equipment or additional space.

SUMMARY OF THE INVENTION

Accordingly, an object of the invention is to provide a method and apparatus for degaussing or altering the magnetic field created by conductor bus bars carrying electric current to the electrolytic pots of an aluminum pot line wherein the pots are disposed in series end-to-end relationship.

It is another object to provide degaussing apparatus which does not hinder the personnel operating the potline.

A further object is to provide an arrangement or apparatus which requires a minimum capital outlay, which can be fabricated from materials readily available in an aluminum production plant, and which does not occupy extensive space in the plant.

To these and other ends, the subject invention contemplates the disposition of an independent degaussing means substantially parallel to the conductor bus bars of the potline to compensate for the magnetic effects produced by the electric current carried by the bus bars of the neighboring row.

In the system or arrangement of the invention, plural electrolytic pots are arranged in end-to-end relationship in at least two rows. The pots are of the type ordinarily used in aluminum production and are adapted to contain molten aluminum metal therein, the molten aluminum being generated by the electrolysis of an alumina-cryolite bath. Plural conductor bus bars are arranged in parallel and extend longitudinally of the rows of pots to conduct electric current to the pots for the operation thereof. The bus bars are connected in series, i.e. from the cathode of one pot to the anode of the next adjacent pot. These bus bars are adapted to carry electric current in excess of 100,000 amperes and are disposed on about the same horizontal level as the molten metal in the pots.

The degaussing means of the present invention is a continuous bus bar which is independent of and disposed substantially parallel to the conductor bus bars which bring electricity to the pots. The degaussing bus bar is located at the rear of each row of pots and on the same horizontal level as the conductor bus bars but closer to the respectively adjacent row of pots than the other of the two rows of pots. An electric current of usually less than about 25 percent of the amount carried by the conductor bus bars flows through the degaussing bus bar in the opposite direction to the flow of current through the pots, thereby providing compensation for the magnetic fields of the opposite row of pots.

BRIEF DESCRIPTION OF THE DRAWINGS

FIG. 1 is a broken schematic plan view of an aluminum potline showing the location of the degaussing means in accordance with the invention;

FIG. 2 is an enlarged partial plan view of the aluminum potline similar to FIG. 1; and FIG. 3 is a broken, enlarged and detailed elevational view taken along the line 3—3 of FIG. 2.

DETAILED DESCRIPTION

Referring to FIG. 1 of the drawings, there is shown aluminum potline 10 including plural electrolytic pots 12 adapted to produce aluminum metal therein upon electrolysis of a cryolite-alumina bath. Pots 12 are arranged in plural rows 11 in series end-to-end relationship, pots 12 being supplied with electric current by plural conductor bus bars 14. Independent degaussing bus bar 16 is disposed substantially parallel to and at substantially the same elevation as conductor bus bars 14 to provide compensation for or to adjust the magnetic effects created by the electric current flowing through conductor bus bars 14.

As is well known in the art, aluminum is manufactured by the electrolysis of a molten bath which comprises alumina and cryolite. As best seen in FIG. 3, the alumina and cryolite are disposed for this purpose within plural electrolytic pots 12, which are conventionally comprised of outer housing 18, fabricated of a suitable metal, and inner lining 20, fabricated of carbon, shaped to form a cavity. It is necessary for electrolysis that there be an anode 22 and a cathode, which in the present system comprises inner lining 20 of electrolytic pot 12. Anode 22 is of the Soderberg or continuous type and is located above but in contact with the alumina-cryolite bath in order to provide a complete circuit for electolysis. The anode can also be composed of multi prebaked anodes suspended above the cathode.

Pots 12 are arranged so that their short dimensions are in parallel end-to-end relationship and their long dimensions are aligned to form a straight row. It is presently contemplated that up to 35 or even 50 pots 12 may be disposed in a single row 11, at least two rows 11 of pots 12 being necessary to form potline 10 in order to allow efficient use of electric current. In a large potline 10 rows 11 of pots 12 are at a center-to-center distance of approximately 40 feet, a portion of that distance between pots 12 serving as a work area for personnel. Pots 12 comprising row 11 are supported by plural channels 26, which in turn rest upon concrete blocks 28. Potline 10 is housed in a suitable building or structure 48.

Rectifier station 50, shown schematically in FIG. 1, is the immediate source of the current which is distributed through conductor bus bars 14 to pots 12. Conductor bus bars 14 are arranged in substantially parallel relationship and extend longitudinally of rows 11 of pots 12, as best seen in FIG. 2, to provide electric current thereto. Conductor bus bars 14 are connected in series, i.e. from cathode 20 of one pot 12 to anode 22 of the next adjacent pot.

Anode bus bars 30 and cathode bus bars 40 comprise conductor bus bars 14. These bus bars 14 are fabricated of aluminum bars or the like and are of relatively long length and about 2-½ inches by 16 inches in cross section. Current is supplied to anode 22 of each pot 12 by means of plural anode bus bars 30, which in turn are supported by a superstructure (not shown) in a conventional manner. Anode bus bars 30 are connected by leads 32 and plural anode pins 34 to anode 22. In the inner lining or cathode 20 of electrolytic pot 12 the current is received by cathode bars 36. Cathode bars 36, which are disposed throughout inner lining or cathode 20, connect to leads 38 and hence to plural cathode bus bars 40. Due to the high electric current presently contemplated to be carried by conductor bus bars 14 (in excess of 100,000 amperes), cathode bus bars 40 are arranged so that cathode bars 36 extend from various localities along the length of cathode bus bars 40 to receive the electric current from throughout the area of each pot 12. Connecting pots 12 in series results in a voltage drop across each pot of only about four to 6 volts, however. Cathode bus bars 40 are supported on columns 42 such that cathode bus bars 40 are located on about the same horizontal level as the molten aluminum metal contained within electrolytic pots 12.

As some existing and contemplated aluminum production installations are of extremely large size, concrete blocks 28 supporting electrolytic pots 12 are disposed on lower floor 44. Upper floor 46 is thus essential for the personnel operating potline 10 to work about pots 12. Cathode bus bars 40 may be disposed in the space between lower floor 44 and upper floor 46. Therefore, cathode bus bars 40 may be located at the same level as the molten aluminum in pots 12. The practice of this invention can also be carried out even if there is not air space below the pots.

The current flowing in conductor bus bars 40 to electrolytic pots 12, as well as the connections of the bus bars to the pots, results in the creation of strong magnetic fields about electrolytic pots 12. These magnetic fields may cause the aluminum to move or circulate within pots 12 at a rate of up to about 30 to 40 inches per second with a voltage swing up to 0.50 volt whereas the aluminum preferably moves at about 3 inches per second with a voltage swing of about 0.01 volt. As these magnetic fields cause the molten aluminum in the pot to vary in elevation and as the anode-cathode distance is only on the order of about 2 inches, uneven current distribution tends to develop in pots 12 resulting in inefficient operation. The magnetic fields not only interfere with operation of the rows of pots creating the fields but also interfere with the magnetic fields of the adjacent rows 11 of pots 12.

In accordance with the present invention, degaussing bus bar 16 is disposed longitudinally of rows 11 of electrolytic pots 12 at the "rear" of each row of pots. The "rear" of row 11 of pots 12 may be defined as the edge of the row furthest from an adjacent row of pots. Degaussing bus bar 16 is independent of conductor bus bars 14 and serves to compensate for the magnetic fields created by current flow in conductor bus bars 14 of the neighboring row of pots. This compensating effect is accomplished by balancing the resultant of the magnetic forces acting on a pot 12 by the current flowing both in conductor bus bars 14 for that pot itself and the conductor bus bars providing current to the adjacent rows 11 of pots 12. Each section of degaussing bus bar 16 is preferably fabricated from a length of metal bar, preferably aluminum, although copper or other conductor materials might also be used, and has a cross section about 2-½ inches wide and 16 inches high, forming a continuous, relatively elongated bus bar upon connection of the sections by welding or by connecting bolts 54. Degaussing bus bar 16 is supported on plural columns 52 fabricated from timber or other suitable material and is located in the area between lower floor 44 and upper floor 46 on about the same horizontal level as cathode bus bars 40 and about 2 to 5 feet from cathode bus bars 40, although the latter distance depends upon the factors discussed in more detail below. As degaussing bus bar 16 is located beneath upper floor 46, it does not require useable floor space and does not interfere with operation of potline 10. As shown schematically in FIG. 1, the current flow in degaussing bus bar 16 is opposite the current flow in conductor bus bars 14. It has been found that employment of degaussing bus bar 16 having current flow opposing that in conductor bus bar 14 greatly reduces the variation of pots voltage and consequently may increase the efficiency of the system by as much as 1.8 percent.

If the amount of current in degaussing bus bar 16 is equal to the amount of current in the nearest conductor bus bars 14, the theoretical optimum distance between degaussing bus bar 16 and the centerline of the nearest row 11 of pots 12, in the case of two rows of pots, would be equal to the center-to-center spacing between the nearest row of pots and the row of pots closest thereto. However, as this would require degaussing bus bar 16 to be placed at a great distance from the nearest row 11 of pots 12, it is preferably to provide a smaller current for degaussing bus bar 16, e.g. less than about 25 percent of the current in conducting bus bars 14, and to place degaussing bus bar 16 at a lesser distance from its nearest row 11 of pots than the other of the two rows 11 of pots 12 forming aluminum potline 10. It is presently preferred that with a supply current of 125,000 amperes and a spacing between the centerlines of two adjacent rows of pots of 41 feet, the current in degaussing bus bar 16 should be about 18,000 amperes and degaussing bus bar 16 should be located about 16 feet from the centerline of the nearest row of pots, Employment of a lesser electric current in degaussing bus bars 16 is in some instances more economical than employment of a higher current.

If more than two rows 11 of pots 12 are used in potline 10, degaussing bus bar 16 should be provided with current sufficient to compensate for the combined effects of the other rows 11 of pots 12 on the row of pots to be degaussed. If more than two rows 11 of pots 12 are employed, it is still necessary to locate degaussing bus bar 16 such that it is at the rear of each row of pots. This is accomplished by disposing degaussing bus bar 16 as close as possible to the interior of the outer wall of building or structure 48 and by preventing degaussing bus bar 16 from crossing over conductor bus bars 14 at the points where the latter bus bars connect adjacent rows 11 of pots 12, as best seen in FIG. 2.

Turning now to operation of aluminum pot line 10, current flows from rectifier station 50 through anode bus bars 30 toward row 11 of electrolytic pots 12. This current is distributed from anode bus bars 30 through plural leads 32 and respective anode pins 34 to anode 22 of first electrolytic pot 12 of row 11, as best seen in FIGS. 2 and 3. After passing through the alumina-cryolite bath to produce aluminum metal, the current is received by plural cathode bars 36 in cathode 20. Subsequently, the current flows through respective leads 38 into cathode bus bars 40 and hence into anode 22 for the next pot 12 in row 11. Concurrently, current is caused to flow through degaussing bus bar 16 in an opposing direction to the flow of current through conductor bus bars 14. The opposing directions of flow in conductor bus bars 14 and degaussing bus bar 16, as illustrated in FIG. 1, provide a balancing of their respective magnetic fields and thus reduces the overall magnetic field.

Additionally, it is possible to connect degaussing bus bar 16 at one end thereof to conductor bus bars 14 by means of rectifier station 50. Thus, after current has been utilized in degaussing bus bar 16, it may be cycled into conductor bus bars 14, permitting more effective use of the current.

Thus, the present invention provides an efficient means for degaussing the magnetic field created by conductor bus bars carrying electric current to the pots. The present invention does not interfere with operation of the aluminum potline nor does it necessitate the use of extensive space for its installation. The degaussing bus bar of the present invention may be installed in some existing aluminum pot lines without extensive alteration thereof.

As will be apparent to those skilled in the art in the light of the foregoing disclosure, many modifications, alterations and substitutions are possible in the practice of this invention without departing from the spirit or scope thereof.

We claim:
1. An aluminum potline, comprising:
   a. plural pots adapted for the electrolytic production of molten aluminum metal and arranged in series end-to-end relationship in at least two parallel rows;
   b. mean including plural conductor bus bars arranged in parallel relationship to and extending longitudinally of said rows of pots to provide electric current for the operation of said pots; and
   c. degaussing means independent of said conductor bus bars and substantially parallel thereto to provide compensation for the magnetic effects produced within the molten aluminum metal within said pots by said electric current carried by said conductor bus bars.
2. An aluminum potline as defined in claim 1, wherein said degaussing means includes a continuous bus bar.
3. An aluminum potline as defined in claim 1, wherein said degaussing means is disposed at the rear of each said row of pots.
4. An aluminum potline as defined in claim 1, wherein said degaussing means is adapted to carry an electric current flowing in an opposing direction to the electric current carried by said conductor bus bars.
5. An aluminum potline as defined in claim 4, wherein said first-mentioned electric current is less than about 25 percent of the amount of said last-mentioned electric current.
6. An aluminum potline as defined in claim 1, wherein said conductor bus bars and said degaussing means are disposed in substantially the same horizontal plane.
7. Aluminum potline as defined in claim 4, including means for connecting at least one end of said degaussing means to said conductor bus bars so that the electric current carried by said degaussing means subsequently flows into said conductor bus bars.
8. In an electrolytic aluminum potline wherein the pots are disposed in series end-to-end relationship, an independent current-carrying bus bar arranged substantially parallel to the line of pots to provide compensation for magnetic effects operating of the molten aluminum within the pots.
9. An aluminum pot line comprising:
   a. a plurality of electrolytic pots adapted to produce molten aluminum metal therein and arranged in end-to-end relationship in at least two rows;
   b. means including plural conductor bus bars arranged in parallel relationship and extending longitudinally of said rows of pots to provide electric current for the operation of said pots; wherein the improvement comprises:
   c. means including a continuous bus bar for carrying electric current arranged substantially parallel to said conductor bus bars at the rear of each said row of electrolytic pots to degauss or alter the magnetic field produced by the electric current carried by said conductor bus bars.
10. Method of operating an aluminum potline, comprising:
    a. arranging a plurality of pots adapted to produce molten aluminum metal therein in end-to-end relationship in at least two rows; and
    b. distributing electric current to said pots for the operation thereof by a first current-carrying means arranged longitudinally of said rows of pots; wherein the improvement comprises:
    c. degaussing or altering the magnetic field produced by the flow of electric current in said first current-carrying means by providing a second current-carrying means by providing a second current-carrying means disposed substantially parallel to said first current-carrying means.
11. Method of operating an aluminum potline as defined in claim 10, wherein said second current-carrying means is disposed at the rear of each said row of pots.
12. Method of operating an aluminum potline as defined in claim 10, wherein electric current flows in said second current-carrying means in an opposing direction relative to the electric current flowing in said first current-carrying means.
13. Method of operating an aluminum potline as defined in claim 12, wherein the electric current flowing in said second current-carrying means is less than about 25 percent of the current flowing in said first current-carrying means.
14. Method of operating an aluminum potline as defined in claim 10, including disposing said first current-carrying means and said second current-carrying means in substantially the same horizontal plane.
15. Method of operating an aluminum potline as defined in claim 10, including cycling the current flowing in said second current-carrying means into said first current-carrying means.
16. Method of operating an aluminum potline as defined in claim 10, wherein said second current-carrying means is closer to its respectively adjacent row of pots than the other of said two rows of pots.
17. A method of operating an aluminum potline wherein a plurality of electrolytic pots, each of said pots containing a bath of molten alumina-cryolite adapted to produce molten aluminum when electric current flows therethrough, said pots being arranged in end-to-end relationship in at least two rows for series flow of electric current therethrough which comprises passing electric current in series flow through said rows of pots in one direction and simultaneously flowing a separate electric current along a path separate and spaced from but substantially parallel to the path of the electric current flowing through said pots but in the opposite direction, said separate current having a value up to about 25 percent of the current flowing through said pots.

* * * * *